United States Patent
Reddy

(10) Patent No.: US 12,430,938 B2
(45) Date of Patent: Sep. 30, 2025

(54) PREDICTING MISSING ENTITY IDENTITIES IN IMAGE-TYPE DOCUMENTS

(71) Applicant: Oracle International Corporation, Redwood Shores, CA (US)

(72) Inventor: Vikram Majjiga Reddy, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 193 days.

(21) Appl. No.: 18/335,845

(22) Filed: Jun. 15, 2023

(65) Prior Publication Data
US 2024/0420497 A1 Dec. 19, 2024

(51) Int. Cl.
*G06V 30/413* (2022.01)
*G06V 30/146* (2022.01)
*G06V 30/19* (2022.01)
*G06V 30/414* (2022.01)

(52) U.S. Cl.
CPC .......... *G06V 30/413* (2022.01); *G06V 30/147* (2022.01); *G06V 30/19113* (2022.01); *G06V 30/19147* (2022.01); *G06V 30/414* (2022.01); *G06V 2201/09* (2022.01)

(58) Field of Classification Search
None
See application file for complete search history.

(56) References Cited

U.S. PATENT DOCUMENTS

| 5,613,017 | A | 3/1997 | Rao et al. |
| 6,323,876 | B1 | 11/2001 | Rao et al. |
| 6,449,391 | B1 | 9/2002 | Ku |
| 2010/0040287 | A1 | 2/2010 | Jain et al. |
| 2011/0137898 | A1* | 6/2011 | Gordo ............... G06F 16/93 707/E17.089 |
| 2011/0271177 | A1 | 11/2011 | Bastos et al. |
| 2012/0274991 | A1 | 11/2012 | Roy et al. |
| 2015/0281513 | A1 | 10/2015 | Ozawa |
| 2016/0180163 | A1 | 6/2016 | Ming |
| 2020/0394397 | A1 | 12/2020 | Li et al. |
| 2022/0012483 | A1 | 1/2022 | Li et al. |
| 2022/0036063 | A1 | 2/2022 | Bhuyan et al. |
| 2022/0300735 | A1* | 9/2022 | Kelly ............... G06F 16/93 |

* cited by examiner

*Primary Examiner* — Andrew H Lam
(74) *Attorney, Agent, or Firm* — Invoke

(57) ABSTRACT

Techniques for predicting a missing value in an image-type document are disclosed. A system predicts the identity of a supplier associated with an image-type document in which the supplier's identity may not be extracted by text recognition. When a system determines that the supplier identity cannot be identified using a text recognition application, the system generates a set of machine learning model input features from features extracted from the image-type document to predict the supplier's identity. One input feature is a data file bounds feature indicating whether the image-type document is a scanned document or a non-scanned document. The system predicts a value for the supplier's identity based on the data file bounds value and additional feature values, including color channel characteristics and spatial characteristics of regions-of-interest. The system generates a mapping of values to defined attributes based in part on the predicted value for the supplier's identity.

22 Claims, 8 Drawing Sheets

FIG. 5B

PREDICTING MISSING ENTITY IDENTITIES IN IMAGE-TYPE DOCUMENTS

BENEFIT CLAIMS; RELATED APPLICATIONS; INCORPORATION BY REFERENCE

This application is related to U.S. patent application Ser. No. 18/300,621, filed Apr. 14, 2023, which is hereby incorporated by reference in its entirety.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to predicting a supplier identity in image-type documents for which the supplier identity is not known. In particular, the present disclosure relates to applying a machine learning model to a set of features, including non-textual content, in a document stored as an image-type file to predict the supplier associated with goods and/or services specified in the document.

BACKGROUND

Enterprises utilize machine learning models to extract content from vast quantities of documents. For example, enterprises extract information describing products, quantities, and costs in invoices provided by suppliers. However, some invoices may not include any field identifiable as a "supplier" field. In addition, manual scanning of invoices and information included in graphics and logos make it difficult for text recognition applications and models to identify information in the scanned documents.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 5A-5C illustrate an example embodiment; and

DETAILED DESCRIPTION

Figure 1:
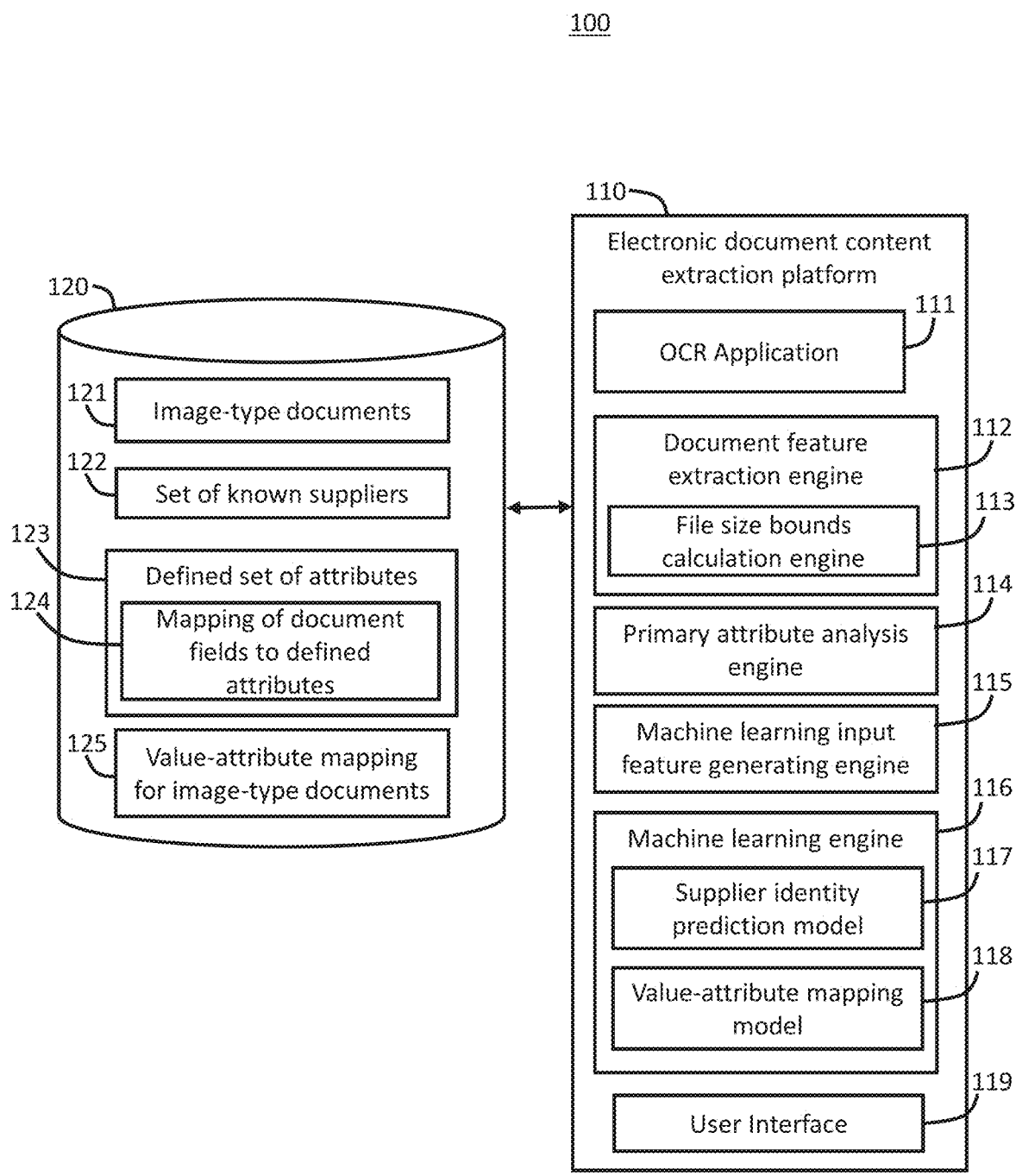
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. PREDICTING SUPPLIER IDENTITY VALUES FOR IMAGE-TYPE DOCUMENTS
4. GENERATING MACHINE LEARNING MODEL INPUT FEATURES FROM FEATURES EXTRACTED FROM AN IMAGE-TYPE DOCUMENT
5. GENERATING A DATA FILE BOUNDS MACHINE LEARNING MODEL INPUT FEATURE VALUE
6. MACHINE LEARNING MODEL TRAINING
7. EXAMPLE EMBODIMENT
8. PRACTICAL APPLICATIONS, ADVANTAGES, AND IMPROVEMENTS
9. COMPUTER NETWORKS AND CLOUD NETWORKS
10. MISCELLANEOUS; EXTENSIONS
11. HARDWARE OVERVIEW

1. General Overview

A machine learning model may be trained to extract information from image-type documents. For example, the model may extract values for key-value pairs, where a "key" corresponds to a defined attribute, and the "value" corresponds to a value for the attribute. Extracting key-value pairs allows a data management application to store the data from the image-type document in a format that allows for automated searching of the document content. Some input features ("primary input features") to the machine learning model have a greater effect on the accuracy of the predictions of the machine learning model than other input features ("secondary input features"). For example, for a machine learning model trained to extract key-value pairs from invoices, the "supplier" is a primary input feature. When the supplier is unknown, the accuracy of the model's predictions degrades substantially.

One or more embodiments predict a supplier identity for an image-type document in which the supplier identity may not be extracted by text recognition. When a system determines that the supplier identity cannot be identified using a text recognition application, the system generates a set of machine learning model input features from features extracted from the image-type document to predict the supplier identity. In one example, scanning invoices by suppliers generates noise in the scanned documents that impedes text recognition via a text recognition application. A system determines whether an image-type document includes noise characteristic of a scanned document. The system uses the classification of the image-type document as a scanned document or a non-scanned document as a predictor, among the set of model input features, to predict the supplier identity. Additional model input features for predicting the supplier identity include: a ratio of heights of horizontal slices, a ratio of widths of adjacent vertical slices, a number of horizontal slices in the image-type document, a diagonal length of at least one region of interest, a compression file size of the at least one region of interest, a color channel of the at least one region of interest, an order of text content in the image-type document, and a content of text in a logo in the image-type document.

For example, a system may determine that a supplier name cannot be identified via a text recognition application of an invoice. The system identifies a header in the invoice. The system extracts additional features from the header, including a ratio of heights of adjacent horizontal slices in the header, and a color channel in the header. Based on the classification as a scanned or non-scanned invoice and a set of additional model input features, the system predicts the supplier identification for the invoice. Based on the supplier identification, the system applies another trained machine learning model to the image-type document to extract information, such as key-value pairs, from the document. According to one example, the system selects a trained machine learning model from among a set of candidate trained models based on the predicted supplier identity. According to another example, the system applies the supplier identity as an input feature in a set of input features for a trained model.

According to one or more embodiments, classifying an image-type document as a scanned or not-scanned document includes comparing two or more image-type documents from a same supplier, where the identity of the supplier is not known. The system analyzes the documents to identify a header portion in the documents. The system stores the header portion of the documents, excluding remaining portions of the documents. The system compares a size of the data files for the respective headers. A difference in size exceeding a threshold is indicative of noise that occurs when scanning a document, as opposed to storing a document electronically without first physically scanning the document. Accordingly, the system classifies the image-type document as a scanned or not-scanned document based on the difference in file sizes between the header of the document and the header of another document from the same supplier.

One or more embodiments predict a value for an attribute associated with an image-type document. A system applies a text-recognition application to a document stored as an image file to extract text content from the document. The text-recognition application may fail to extract any value for a particular attribute. The system may determine that the particular attribute is a high-priority attribute for pairing extracted content-such as words and numbers—with defined attributes. As discussed above, the missing value may correspond to a "supplier" attribute. Alternatively, the missing value may correspond to a "recipient" attribute, or any other attribute the system classifies as a primary, or high-priority, attribute. For example, the system may determine that if a value is not detected for any one of three priority attributes, a machine learning model trained to map values in the image-type document to attributes is likely to have an accuracy that falls below a threshold. If the system detects that a value is not detected for any one of the three priority attributes, the system extracts a set of additional features from the image-type document to predict a value for the missing attributes.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes an electronic document content extraction platform 110 and a data repository. In one or more embodiments, a document content extraction platform 110 refers to hardware and/or software configured to perform operations described herein for extracting text content from an image-type document, predicting missing values for particular attributes that are not identified in the extracted text, and mapping the text content to a defined set of attributes. Examples of operations for predicting values for particular attributes that are not identified in extracted text associated with an image-type document are described below with reference to FIG. 2.

In an embodiment, the document content extraction platform 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, a data repository 120 is any type of storage unit and/or device (e.g., a file system, database, collection of tables, or any other storage mechanism) for storing data. Further, a data repository 120 may include multiple different storage units and/or devices. The multiple different storage units and/or devices may or may not be of the same type or located at the same physical site. Further, a data repository 120 may be implemented or may execute on the same computing system as the electronic document content extraction platform. Alternatively, or additionally, a data repository 120 may be implemented or executed on a computing system separate from the electronic document content extraction platform 110. A data repository 120 may be communicatively coupled to the electronic document content extraction platform 110 via a direct connection or via a network.

Information describing data stored in the data repository 120 may be implemented across any of components within the system 100. However, this information is illustrated within the data repository 120 for purposes of clarity and explanation.

An optical character recognition (OCR) application 111 extracts characters from a document 121 stored as an image-type file. For example, an OCR application 111 may analyze pixels in the image-type file to match sets of pixels to characters. The OCR application 111 further clusters characters into groups of words and/or numbers.

A document feature extraction engine 112 analyzes the image-type document 121 to extract features from the document. For example, the document feature extraction engine 112 identifies regions-of-interest in the image-type document 121. Regions-of-interest are groupings of text, graphics, and/or imagery that are in spatial proximity to each other within the document and share characteristics that make them likely to have semantically-related content. For example, a header is one region of interest and a table is another region of interest. Within the header region-of-interest, a "To:" field with an address is one region of interest. A logo is another region-of-interest. A date is yet another region-of-interest. The document feature extraction engine 112 may identify regions-of-interest based on a combination of the proximity of content within the region-of-interest and other textual characteristics, such as a similarity of font types, sizes, and styles. In one or more embodiments, the document feature extraction engine 112 identifies color channels associated with each region-of-interest. The document feature extraction engine 112 may identify horizontal and vertical slices within the image-type document, where slices are adjacent rows or columns of pixels that share specified attributes. One slice may be made up of a set of adjacent rows of pixels in which less than 97% of the row is a background-type pixel. An adjacent slice may be made up of a set of adjacent rows of pixels in which 97% or more of the row is a background-type pixel. The document feature extraction engine 112 may identify a logo in the document. The logo may include a particular graphic characteristic-including a density of color pixels-different from other regions-of-interest. The document feature extraction engine 112 identifies an order of text in the image-type document 121. For example, the document feature extraction engine 112 determines an order in which "Quantity," "To," "From," "Date," and "No." fields appear in the image-type document.

A primary attribute analysis engine 114 analyzes the extracted text and document features to determine whether one or more primary attributes are identifiable in the image-type document 121. For example, a supplier's name may be specified as a primary attribute. The primary attribute analysis engine 114 may analyze the image-type document to determine whether a word associated with a "To" field or a word in a logo matches a supplier in a set of known suppliers 122. If no word is identified, or if an identified word does not match a known supplier 122, the electronic document content extraction platform 110 uses a supplier identity prediction model 117 to predict the supplier's name or identity.

A machine learning input feature generating engine 115 generates a set of input features for the machine learning model 117. The input features include non-textual features. The input features may also include textual features that are not the name of the supplier. Examples of non-textual machine learning model input features include: a ratio of heights of horizontal slices, where the horizontal slices correspond to rows of pixels in the first image-type document which include content, a ratio of widths of adjacent vertical slices, where the adjacent vertical slices correspond to columns of pixels in the first image-type document which include content, a number of horizontal slices in the image-type document, a diagonal length of a region of interest, a compression file size of a region of interest, a color channel of a region of interest, and a variation of files sizes of two or more documents from the same source supplier, where the identity of the supplier is not included, or is not identifiable, in the text extracted from the image-type document. Examples of textual machine learning model input features include: an order of text content in the image-type document, and a content of text in a logo in the image-type document.

The electronic document content extraction platform 110 provides the input features generated from the information in the image-type document 121 to the supplier identity prediction model 117 to predict a supplier's identity. While FIG. 1 illustrates a supplier identity prediction model 117, one or more embodiments encompass machine learning models for predicting any attribute that the electronic document content extraction platform 110 cannot identify from the extracted text of the image-type document 121. For example, the electronic document content extraction platform 110 may include a recipient identity prediction model.

In some examples, one or more elements of the machine learning engine 116 may use a machine learning algorithm to train a supplier identity prediction model 117 and a value-attribute mapping model 118. A machine learning algorithm is an algorithm that can be iterated to learn a target model f that best maps a set of input variables to an output variable, using a set of training data. A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In an embodiment, a set of training data includes datasets and associated labels. The datasets are associated with input variables (e.g., a data file bounds value, image-type document features including ratios of slice widths or heights, color channels of regions-of-interest, sizes of regions-of-interest, and text order) for the target model f. The associated labels are associated with the output variable (e.g., a supplier's identity) of the target model f. The training data may be updated based on, for example, feedback on the accuracy of the current target model f. Updated training data is fed back into the machine learning algorithm, which in turn updates the target model f.

A machine learning algorithm generates a target model f such that the target model f best fits the datasets of training data to the labels of the training data. Additionally, or alternatively, a machine learning algorithm generates a target model f such that when the target model f is applied to the datasets of the training data, a maximum number of results determined by the target model f matches the labels of the training data.

In an embodiment, a machine learning algorithm can be iterated to learn a relationship between features in an image-type document and a supplier associated with the image-type document. In an embodiment, a set of training data includes historical image-type documents, such as invoices. The historical image-type documents are associated with labels, indicating a particular supplier associated with the image-type documents.

Based on the predicted supplier identity, the system applies the value-attribute mapping machine learning model 118 to document data for the image-type document 121 to extract information from the image-type document 121. In particular, the value-attribute mapping model 118 identifies values in the image-type document 121 that correspond to attributes in the defined set of attributes 123. In some instances, a text name in a field of the image-type document 121 is not the same as its corresponding attribute name. For example, an invoice may include a field "To:" The corresponding attribute may be "Source." The value-attribute mapping model 118 maps a value in the image-type document 121 associated with the "To:" field to the "Source" attribute and stores the value in a field associated with the attribute "Source." The value-attribute mapping model 118 generates a value-attribute mapping 125 for the image-type document 121.

In one embodiment, the system converts the supplier's identity to numerical format and includes the converted supplier's identity as an input feature to provide to the value-attribute mapping model 118, together with the text extracted by the OCR application 111 and the features extracted by the document feature extraction engine 112.

According to an alternative embodiment, the electronic document content extraction platform 110 trains a set of machine learning models to map values in image-type documents to corresponding sets of attributes associated, respectively, with corresponding sets of suppliers. Using the predicted supplier identity, the electronic document content extraction platform selects a particular machine learning model from among the set of candidate machine learning models. For example, the system may store three different machine learning models corresponding to three distinct sets of suppliers. Each machine learning model may be particularly trained to extract content from a certain document type or document format. Upon predicting the supplier's identity, the electronic document content extraction platform 110 may refer to the mapping of supplier identities to candidate trained machine learning models to select the appropriate model for extracting content from an image-type document associated with the predicted supplier.

In one or more embodiments, interface 119 refers to hardware and/or software configured to facilitate communications between a user and the electronic document content extraction platform 110. For example, a user may interact with the interface 119 to provide inputs to supervise training of one or both of the machine learning models 117 and 118, to modify a defined set of attributes 123, and to modify a mapping of fields in image-type documents to defined attributes. Interface 119 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 119 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 119 is specified in one or more other languages, such as Java, C, or C++.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 9, titled "Computer Networks and Cloud Networks."

3. Predicting Supplier Identity Values for Image-Type Documents

Figure 2:
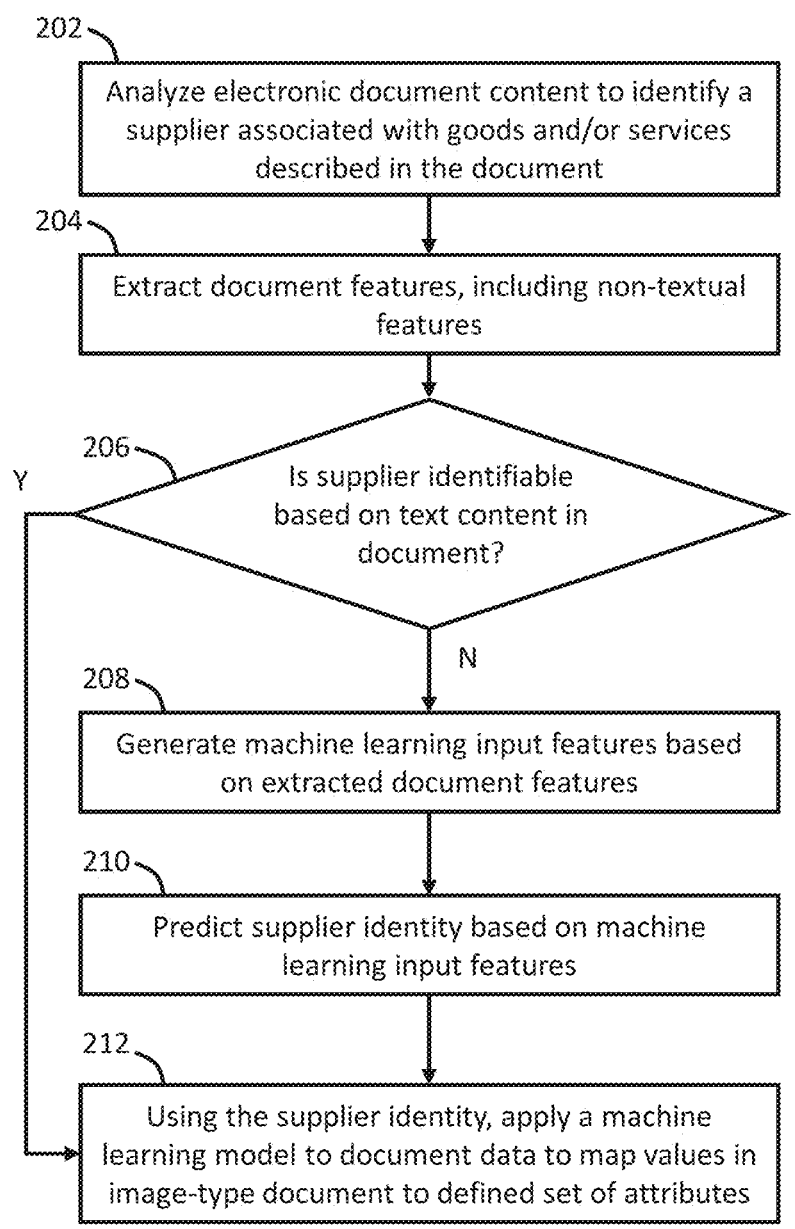
FIG. 2 illustrates an example set of operations for predicting supplier identity values for image-type documents in accordance with one or more embodiments.

FIG. 2 illustrates an example set of operations for predicting supplier identities for image-type documents in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system analyzes an image-type document to identify a supplier associated with goods and/or services in the document (Operation 202). For example, a system may apply a text recognition application to a document stored as an image file to search for a supplier name in the document. In one or more embodiments, the document is an invoice or other document including a header and content specifying goods and/or services provided from a supplier. In one or more embodiments, the document is stored in an image file format, such as a JPEG-type file. In the present specification and claims, an image-type document refers to a document stored as an image in an image-type format, such as JPEG. The image-type format stores pixel values corresponding to different shades. In contrast, a word-processing document is stored as character data.

The system further extracts features, including non-textual features, from the image-type document (Operation 204). For example, the system identifies regions-of-interest in the image type document. The system determines the dimensions and locations of the regions-of-interest. The system determines the order in which particular regions of interest are arranged in the image-type document. The system identifies content-type slices and non-content-type slices in the header of the image-type document and in a body-portion of the image-type document. The system identifies a region-of-interest associated with a logo.

The system determines whether the supplier identity is identifiable in the text content of the image-type document (Operation 206). For example, a document may include a "from" field that is mapped to an attribute "supplier." The system may identify a name beside or below "from" as being the supplier identity. In addition, or in the alternative, the document may map other words to the attribute "supplier," such as: "sent by," "remit payment to," and "ship from." According to one or more embodiments, the system may identify a name at a particular location in a document, such as a left side, right side, or center of a header of the document as being the supplier's name.

However, the system may not be able to identify a supplier name from text in the document. For example, if the supplier's name is in a logo of the document, the system may not be able to extract the text name from the logo. The logo may include shapes and/or colors to form the supplier's name, and the system may not be capable of extracting the name from the shapes and colors. The supplier's name may be inside a colored portion of the logo, and the system may not be able to distinguish between the color of the logo and the text inside the logo. According to one or more examples, a document may not include a supplier's name. The document may include a supplier's address without including the name. There may be no name above the address in the document. Alternatively, a name above the address may not correspond to a supplier's name. According to another example, two or more suppliers may share the same address, or portions of the same address.

If the system determines in Operation 206 that the supplier's name is not identifiable in the document text, the system generates machine learning model input features from information extracted from the image-type document (Operation 208). The input features include non-textual features. The input features may also include textual features that are not the name of the supplier. Examples of non-textual machine learning model input features include: a ratio of heights of horizontal slices, where the horizontal slices correspond to rows of pixels in the first image-type document which include content, a ratio of widths of adjacent vertical slices, where the adjacent vertical slices correspond to columns of pixels in the first image-type document which include content, a number of horizontal slices in the image-type document, a diagonal length of a region of interest, a compression file size of a region of interest, a color channel of a region of interest, and a variation of files sizes of two or more documents from the same source supplier, where the identity of the supplier is not included in the document. Examples of textual additional attributes include: an order of text content in the image-type document, and a content of text in a logo in the image-type document.

According to one or more embodiments, the system determines which features are present and determines whether to predict the supplier's identity based on the features present. For example, the system may determine that a color channel of a region-of-interest and a file-size bounds feature (e.g., a measure of the difference in file-sizes between two image-type documents from the same supplier, where the supplier's identity is not known) are primary features for predicting a supplier's name. The system may determine that if: (a) the color channel of the image-type document does not match a known color channel for a known supplier, and (b) the file-size bounds feature does not match a known file-size bounds features for a known supplier, then the likelihood of an accurate prediction is low. The system may tag the image-type document for user analysis to identify the supplier's name, without predicting the supplier's identity. Alternatively, the system may predict the supplier's identity and also generate a notification for a user to review the prediction to ensure accuracy. The system may update the machine learning model for predicting the supplier's identity based on a user response to the notification, confirming the prediction or indicating the prediction was incorrect.

The system predicts a supplier's identity based on the generated machine learning model input features (Operation 210). In one or more embodiments, the system converts content describing the features into numerical values and generates an input vector for a machine learning model to predict the supplier's identity for the image-type document.

Based on the predicted supplier identity, the system applies a second machine learning model to document data for the image-type document to extract information from the image-type document (Operation 212). In one embodiment, the machine learning model classifies text content as key-value pairs, or as pairs of attributes and values for the attributes. The second machine learning model maps values contained in the image-type document, and extracted via text recognition, with a defined set of attributes associated with the image-type document. In one or more embodiments, the document data includes: (a) text content extracted with an OCR application, and (b) additional features including spatial relationships among regions-of-interest, color features, and characteristics of content slices and non-content slices in the image-type document.

In one embodiment, the system converts the supplier's identity to numerical format and includes the converted supplier's identity as an input feature to provide to the second machine learning model, together with the document data. According to an alternative embodiment, the system selects a machine learning model from among a set of candidate machine learning models using the supplier's identity. For example, the system may store three different machine learning models corresponding to three distinct sets of suppliers. Each machine learning model may be particularly trained to extract content from a certain document type or document format. Upon predicting the supplier's identity, the system refers to the mapping of supplier identities to candidate trained machine learning models to select the appropriate model for extracting content from an image-type document associated with the identified supplier.

4. Generating Machine Learning Model Input Features from Features Extracted from an Image-Type Document If a system determines that a supplier's name is not identifiable in document text, the system generates a set of machine learning model input features from features extracted from an image-type document. The input features include non-textual attributes. The input features may also include textual attributes that are not the name of the supplier. Examples of non-textual input features include: a ratio of heights of horizontal slices, where the horizontal slices correspond to rows of pixels in the first image-type document which include content, a ratio of widths of adjacent vertical slices, where the adjacent vertical slices correspond to columns of pixels in the first image-type document which include content, a number of horizontal slices in the image-type document, a diagonal length of a region of interest, a compression file size of a region of interest, a color channel of a region of interest, and a variation of files sizes of two or more documents from the same source supplier, where the identity of the supplier is not included in the document. Examples of textual input features include: an order of text content in the image-type document, and a content of text in a logo in the image-type document.

According to one or more embodiments, a system obtains a background projection profile to differentiate between background pixels and foreground pixels in an image-type document. For example, the system may calculate average pixel values in an entire image-type document to identify a threshold value corresponding to a value of a background pixel. The system labels the pixels in the image-type document as foreground pixels or background pixels based on comparing the pixel values to the threshold. The system obtains a different background projection profile for different documents to provide accurate classification of foreground regions for documents with different shades of background pixels. For example, a document with a white background and gray text has a different background projection profile than a document with a gray background and black text.

The system classifies sets of rows of pixels as horizontal content slices or non-content slices based on grouping the sets of rows of pixels according to how many background pixels are in each of the rows of pixels. The system differentiates between content rows of pixels and non-content rows of pixels by comparing the percentage of background pixels in rows of pixels to a threshold. For example, a system may label a row of pixels as a non-content row of pixels based on determining at least 95% of the pixels in the row are background pixels. The system groups a set of adjacent rows of pixels classified as content rows into a content slice. The system calculates the number of slices in an image-type document based on the number of content- and non-content slices in the document. The system may also calculate the number of slices in a region-of-interest in the image-type document. For example, the system may calculate the number of slices in the header of an image-type document.

In addition, or in the alternative, the system may classify columns of pixels as vertical content slices or non-content slices based on grouping the sets of columns of pixels according to how many background pixels are in each the column of pixels.

The system determines the sizes of horizontal and/or vertical slices in the image-type document to calculate a ratio of heights of horizontal slices and/or a ratio of widths of vertical slices. The system may calculate the ratio of heights of horizontal slices by comparing a height of a slice with the smallest height to a slice with the greatest height. The system may also calculate an ordered set of ratios of heights of adjacent horizontal slices by comparing pairwise heights in sequential order from top to bottom. For example, it may calculate a ratio by comparing the first height to the second height, another ratio by comparing the second height to the third, another ratio by comparing the third to the fourth, and so on. The final set of ratios may contain all pairwise comparisons from top to bottom or it may contain some ordered subset of the entire ordered set. The system may further calculate average heights of slices. The ratios of heights and/or widths of slices may be based only on content-type slices (e.g., slices that include a ratio of foreground pixels exceeding a threshold) or non-content-type slices. The system may provide the ratio(s) as an input feature for a machine learning model to predict a supplier name or identity.

The system calculates a diagonal length of a region of interest by (a) determining the horizontal and vertical bounds of the region-of-interest, and (b) calculating the diagonal length from one corner to an opposing corner. A region-of-interest may be, for example, a header of an invoice. Unlike the body of the invoice which lists items and quantities and/or costs, the header of the invoice tends to include similar content among different invoices. For example, the header may include a logo, address, date, and invoice number. The header tends to include more non-text regions than text regions.

The system calculates a compression file size of a region-of-interest by cutting the region-of-interest from the remainder of the image-type document, and storing only the region-of-interest. For example, upon identifying an invoice header, the system stores the invoice header without storing the body of the invoice, including a list of items and quantities of the items.

The system identifies an order of text content in the image-type documents. For example, one invoice may have an address section on the left side of the header. Another may have the address section in the middle of the header. Yet another may have the address section at the right side of the header. Different suppliers may locate a date, a logo, an address, and an invoice number at different locations in the header.

5. Generating a Data File Bounds Machine Learning Model Input Feature Value

Figure 3:
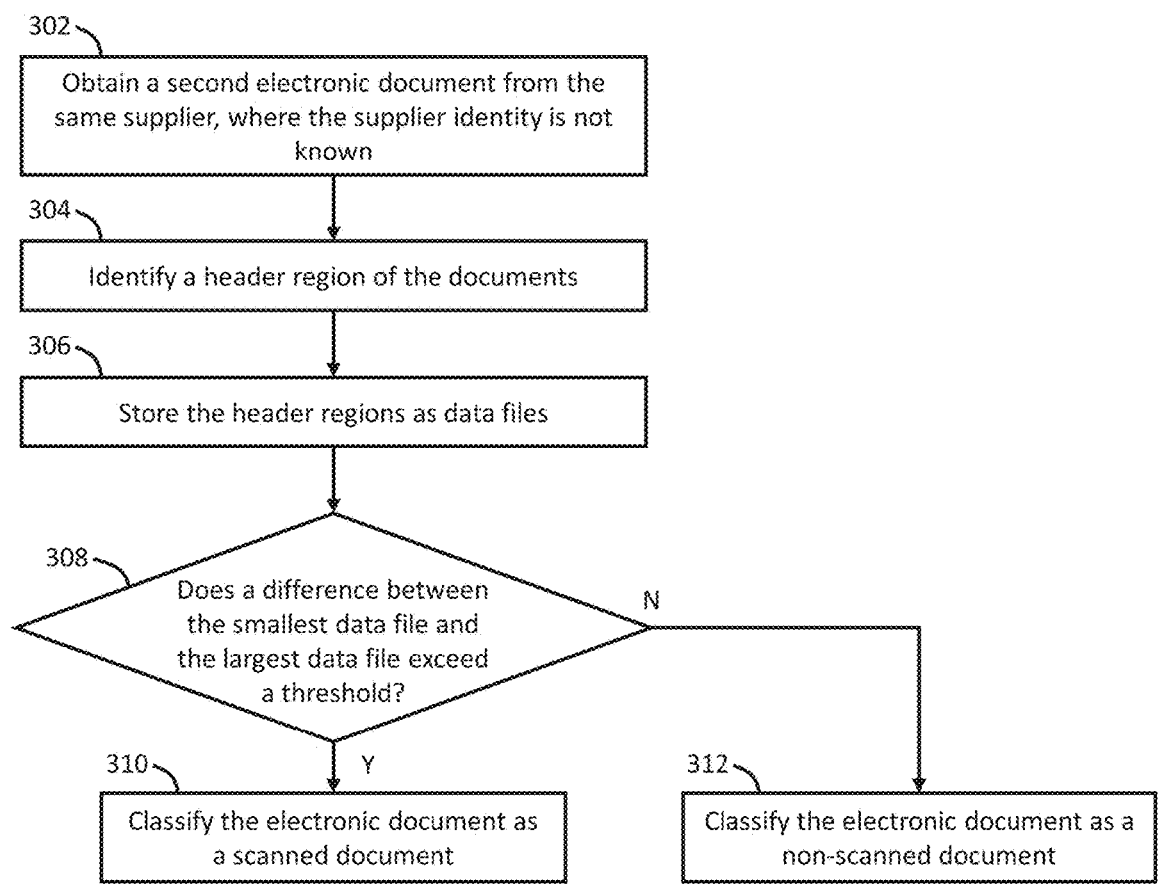
FIG. 3 illustrates an example set of operations for generating a data file bounds machine learning input feature value in accordance with one or more embodiments.

FIG. 3 illustrates an example set of operations for generating a data file bounds input feature value for a machine learning model for predicting a supplier's identity, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

Among a set of additional features that a system may use to predict a supplier's identity, the system may approximate noise in a document using a data file bounds value. The system generates the data file bounds value by comparing file sizes of sets of documents from a same supplier. Different data file bounds values indicate whether a set of image-type documents is scanned or not scanned. A machine learning model may learn a correlation between scanned/not scanned documents, as well as other input features, and particular suppliers.

For example, a user may receive an invoice electronically via electronic mail (email), an accounting application, or another application. Alternatively, a user may receive a paper invoice or print an invoice onto paper. The user may then scan the paper invoice to generate an image-type document. Scanning a document results in noise in the resulting image. For example, small particles may be present on a scanning surface. A scanner may generate foreground pixels instead of background pixels and vice versa. Movement of a paper during scanning results in blurring of document content. Accordingly, if the same document is scanned twice, it is likely to vary in storage size. Likewise, two similar documents from the same supplier that are scanned are likely to have a greater variation in storage size than two similar documents from the same supplier that are generated electronically, without scanning. Since some suppliers tend to generate paper invoices that must be scanned prior to data extraction and other suppliers generate electronic invoices that are not scanned prior to data extraction, the attribute of scanned or not-scanned documents may be used as one input feature among a set of input features used to predict a particular supplier identity.

One or more embodiments calculate a "file-size bounds" value associated with a set of two or more image-type documents. The file-size bounds value corresponds to a difference between the file sizes of two image-type documents from a same supplier. The difference in file sizes may be used to approximate the presence or absence of noise, corresponding to scanning documents.

A system obtains at least two image-type documents from the same supplier, where the identity of the supplier is not known (Operation 302). For example, when analyzing the content of image-type documents, a system may provide a batch of documents from the same source to an application for analysis. Based on determining the supplier's identity cannot be extracted from the document (See Operation 204, above), the system obtains a second image-type document from the same batch of documents corresponding to the same supplier.

The system identifies a header region of the documents (Operation 304). The system may identify the header region by comparing the ratio of background to foreground pixels in different portions of the documents, identifying tables in the documents, and identifying portions of the documents including graphics and logos. For example, invoices tend to have different content (e.g., they describe different quantities of different items). Accordingly, analyzing the differences in file sizes of entire invoices may not be useful to predict a supplier. However, since the header of an invoice tends to include similar content among different invoices, the header may be a useful portion of a document for predicting a supplier. An invoice header for one supplier tends to have the same fields and graphics among all the invoices. An invoice header for another supplier tends to have a different set of fields and graphics unique to the supplier.

The system stores the header regions as data files (Operation 306). For example, the system may separate the header portion from the body portion listing items and quantities, and store only the header portion, while not storing the body portion that is not a part of the header portion.

The system compares the data size of the data files for the header portions to determine whether the difference between the smallest data file and the largest data file exceeds a threshold (Operation 308). For example, the system may determine that a set of data files corresponding to electronically-stored, and non-scanned, document headers tend to be in a range from 50 kilobytes (KB) to 55 KB for one supplier, 60-64 KB for another supplier, and 44-47 KB for a third supplier. The system may determine that a set of data files corresponding to scanned document headers tend to be in a range from 50-60 KB for a fourth supplier, 33-39 KB for a fifth supplier, and 66-75 KB for a sixth supplier. The system may set a threshold for classifying a document as "scanned" above the largest variation for electronically-stored and non-scanned documents. For example, since the largest variation among the non-scanned documents is 5 KB, the system may set the threshold at 6 KB.

The set of documents on which the system performs the comparison may be as small as two documents, and there is no particular upper limit. For example, the system may compare the storage size of a set of five documents from the same supplier. The storage sizes may be 41 KB, 41 KB, 44 KB, 45 KB, and 46 KB. The system calculates the difference between the document with the smallest storage size (i.e., 41 KB) and the largest storage size (i.e., 46 KB). In the present specification and claims, the difference between a file size of two or more image-type documents from a same supplier, where the supplier identity is not known, is referred to as file-size bounds.

If the file-size bounds exceed the threshold for a scanned document, the system classifies the image-type document as a scanned document (Operation 310). Otherwise, the system classifies the image-type document as a non-scanned document (Operation 312). As discussed above in FIG. 2, the system uses the classification as an input feature to a machine learning model to predict a supplier identity for an image-type document. The system may convert the classification to a binary value, such as "1" for "scanned" and "0" for "non-scanned." Alternatively, the system may provide the file-size bounds value for a set of documents (or, for example, data files storing document headers) as an input feature to the machine learning model. In an embodiment in which the system provides the file size bounds as the input feature, the system may omit the steps of comparing the file-size bounds to a threshold and classifying the document as scanned or not-scanned. Instead, the machine learning model may be trained to determine a relationship between file-size bounds, other input features, and the output value for a supplier identity.

6. Machine Learning Model Training

Figure 4:
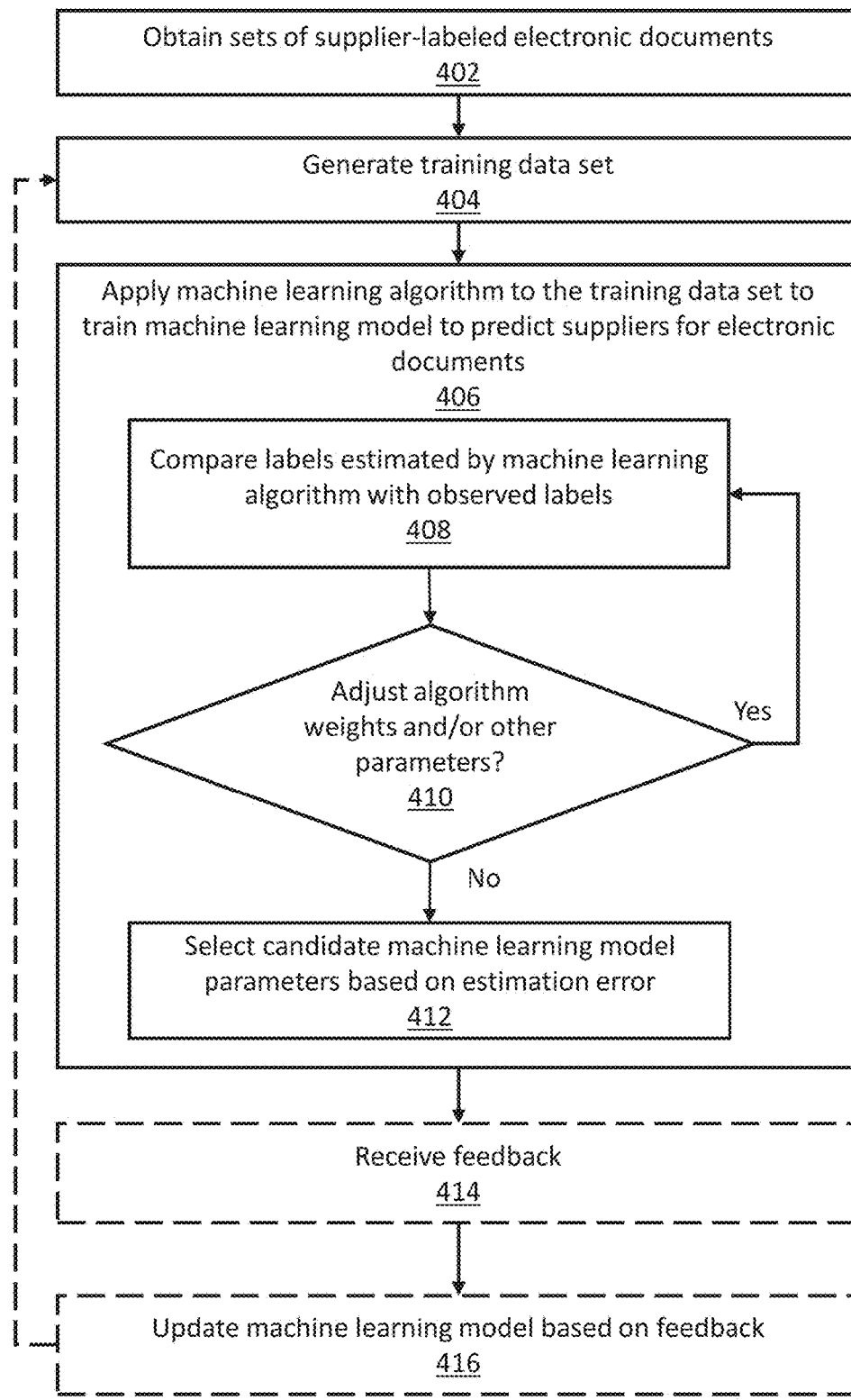
FIG. 4 illustrates an example set of operations for training a machine learning model to predict a supplier identity in accordance with one or more embodiments.

FIG. 4 illustrates an example set of operations for training a machine learning model to predict a supplier identity for an image-type document, in accordance with one or more embodiments. A system obtains supplier-labeled image-type document data (Operation 402). For example, users may generate labels for invoices indicating an identity of the suppliers of the invoices.

Once the various data (or subsets thereof) are identified in Operation 402, the system generates a set of training data (operation 404).

The system applies a machine learning algorithm to the training data set to train the machine learning model (Operation 406). For example, the machine learning algorithm may analyze the training data set to train neurons of a neural network with particular weights and offsets to associated particular non-textual and textual features in image-type documents with particular suppliers.

In some embodiments, the system iteratively applies the machine learning algorithm to a set of input data to generate an output set of labels, compares the generate labels to pre-generated labels associated with the input data, adjusts weights and offsets of the algorithm based on an error, and applies the algorithm to another set of input data.

In some embodiments, the system compares the labels estimated through the one or more iterations of the machine learning model algorithm with observed labels to determine an estimation error (Operation 408). The system may perform this comparison for a test set of examples, which may be a subset of examples in the training dataset that were not used to generate and fit the candidate models. The total estimation error for a particular iteration of the machine learning algorithm may be computed as a function of the magnitude of the difference and/or the number of examples for which the estimated label was wrongly predicted.

In some embodiments, the system determines whether to adjust the weights and/or other model parameters based on the estimation error (Operation 410). Adjustments may be made until a candidate model that minimizes the estimation error or otherwise achieves a threshold level of estimation error is identified. The process may return to Operation 408 to make adjustments and continue training the machine learning model.

In some embodiments, the system selects machine learning model parameters based on the estimation error meeting a threshold accuracy level (Operation 412). For example, the system may select a set of parameter values for a machine learning model based on determining that the trained model has an accuracy level for predicting labels for medical claims of at least 98%.

In some embodiments, the system trains a neural network using backpropagation. Backpropagation is a process of updating cell states in the neural network based on gradients determined as a function of the estimation error. With backpropagation, nodes are assigned a fraction of the estimated error based on the contribution to the output and adjusted based on the fraction. In recurrent neural networks, time is also factored into the backpropagation process. For example, a set of input data points may include a sequence of related invoices from a supplier. Each invoice may be processed as a separate discrete instance of time. For instance, an example may include invoices $c_1$, $c_2$, and $c_3$ corresponding to times t, t+1, and t+2, respectively. Backpropagation through time may perform adjustments through gradient descent starting at time t+2 and moving backward in time to t+1 and then to t. Further, the backpropagation process may adjust the memory parameters of a cell such that a cell remembers contributions from previous invoice in the sequence of invoices. For example, a cell computing a contribution for $e_3$ may have a memory of the contribution of $e_2$, which has a memory of $e_1$. The memory may serve as a feedback connection such that the output of a cell at one time (e.g., t) is used as an input to the next time in the sequence (e.g., t+1). The gradient descent techniques may account for these feedback connections such that the contribution of one invoice to a cell's output may affect the contribution of the next invoice in the cell's output. Thus, the contribution of c/may affect the contribution of $c_2$, etc.

Additionally, or alternatively, the system may train other types of machine learning models. For example, the system may adjust the boundaries of a hyperplane in a support vector machine or node weights within a decision tree model to minimize estimation error. Once trained, the machine learning model may be used to predict suppliers for image-type documents.

In embodiments in which the machine learning algorithm is a supervised machine learning algorithm, the system may optionally obtain feedback on the various aspects of the analysis described above (Operation 414). For example, the feedback may affirm or revise labels generated by the machine learning model. The machine learning model may indicate that a particular invoice is associated with a label identifying a particular supplier. The system may receive feedback indicating that the particular invoice should instead be associated with a different supplier. Based on the feedback, the machine learning training set may be updated, thereby improving its analytical accuracy (Operation 416). Once updated, the system may further train the machine learning model by optionally applying the model to additional training data sets.

7. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 5A:
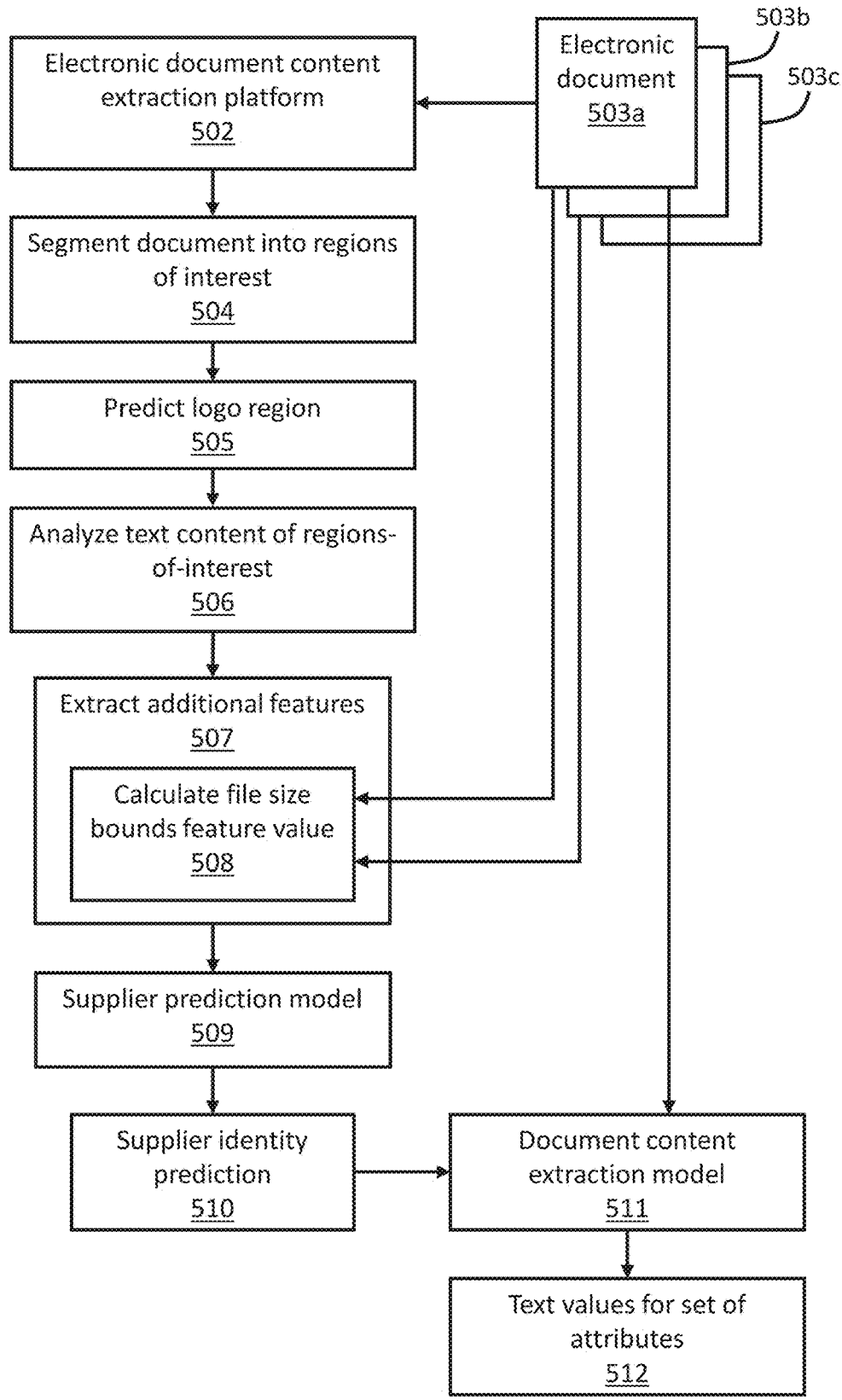

Referring to FIG. 5A, an electronic content extraction platform 502 obtains a set of image-type documents 503a-503c to be analyzed for content extraction. The documents 503a-503c are image-type documents, such as picture files (e.g., JPEG or PNG-type files) or PDF-type files. The electronic content extraction platform 502 segments a document (such as document 503a) into regions-of-interest (Operation 504). A region-of-interest is a grouping of text, graphics, and/or imagery that is likely to have semantically-related content.

Figure 5B:
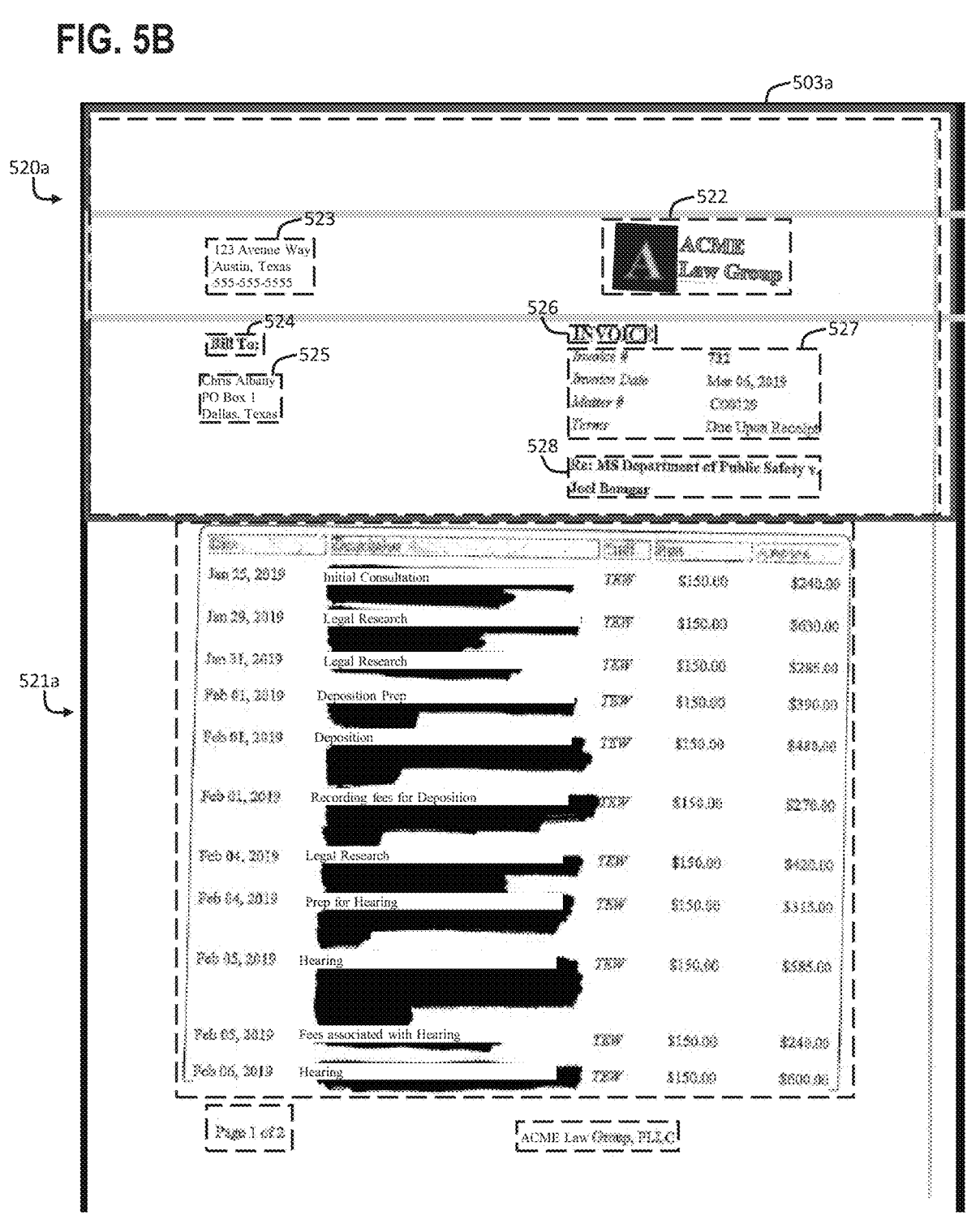
Figure 5C:
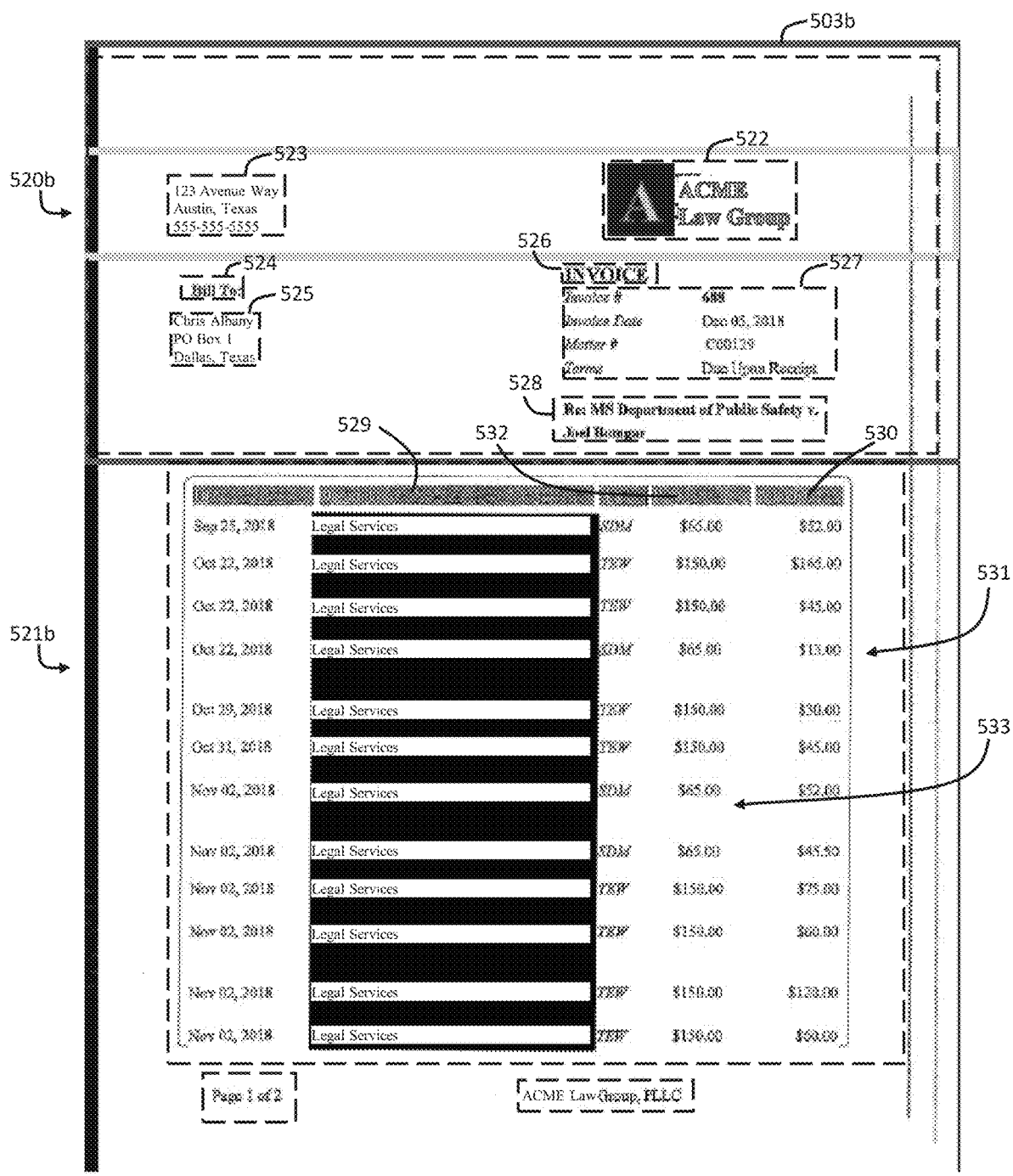

FIG. 5B illustrates an example of the image-type document 503a. FIG. 5C illustrates an example of the image-type document 503b. Referring to FIG. 5B, the electronic content extraction platform 502 analyzing background and foreground pixels in the image-type document 503a to identify a header 520a and a body 521a of the document 503a. The electronic content extraction platform 502 may compare a ratio of background and foreground pixels in different regions of the document 503a to identify the header as a region with a larger ratio of background to foreground pixels. The electronic content extraction platform 502 may also identify table-type properties, such as a box around a listing of goods and/or services, or a grid separating items listed in the body 521a to identify the body 521a. The electronic content extraction platform 502 further identifies regions of interest 522, 523, 524, 525, 526, 527, and 528. According to one example embodiment, the electronic content extraction platform 502 identifies the regions of interest 522-528 in the header 520a by dividing the header 520a into horizontal and/or vertical slices. As discussed above, a slice is a set of rows of pixels, or a set of columns of pixels, that include particular background/foreground characteristics. For example, the electronic content extraction platform 502 may identify adjacent rows of pixels as being part of the same slice if the rows have a percentage of background pixels exceeding 97%. The electronic content extraction platform 502 may generate the regions-of-interest 522-528 from among the slices based on: a distance of text to other text in a horizontal and a vertical direct, a similarity or difference of text style and size between adjacent text, and the presence or absence of graphics or image content under the text or near the text.

The system analyzes the regions of interest 522-528 to determine whether one of the regions-of-interest is a logo (Operation 505). The electronic content extraction platform 502 identifies the region-of-interest 522 as including a logo by identifying a particularly dense grouping of foreground pixels relative to other regions-of-interest. The electronic content extraction platform 502 applies an optical character recognition (OCR) application to extract characters from the regions-of-interest 522-528, including the logo 522, and to group the characters into words. The electronic content extraction platform 502 determines whether any of the extracted text is recognizable as a supplier name for the image-type document 503a.

Referring to FIG. 5B, the invoice 503a includes the supplier's name ("ACME Law Group"). However, due to the characteristics of the image-type document 503a, the OCR application is unable to extract the supplier's name. For example, the text may be a block-type text that is unreadable by the OCR application, the image is a scanned image and is displayed at an angle, which reduces the accuracy of the OCR application, and the text is blurry in the image.

Since the OCR application cannot extract the supplier's name from the document 503a, the electronic content extraction platform 502 extracts additional features from the document 503a to predict the supplier's name (Operation 507). The electronic content extraction platform 502 identifies a color channel in the logo region 522 to determine if the color channel matches a color channel associated with one or more known suppliers. The electronic content extraction platform 502 generates a data file corresponding to the header 520a and excluding the body 520b. The electronic content extraction platform 502 determines a file size of the data file. The electronic content extraction platform 502 analyzes characteristics of content slices and non-content slices in the document 503a. For example, the electronic content extraction platform 502 identifies a ratio of sizes of content slices (e.g., sets of adjacent rows of pixels including background or foreground pixels exceeding a threshold). The electronic content extraction platform 502 may determine a ratio of a set of one or more smallest content slices (e.g., slices having the smallest height) and a set of a same number of one or more tallest content slices. The electronic content extraction platform 502 determines an order in which text appears in the document 503a. For example, the electronic content extraction platform 502 determines that the address region-of-interest 523 appears to the left of the logo region-of-interest 522. The electronic content extraction platform 502 determines that the invoice information region-of-interest 527 appears below the logo region-of-interest 522.

The electronic content extraction platform 502 calculates a file size bounds feature value for the document 503a and at least one other document 503b and 503c (Operation 508). The electronic content extraction platform 502 obtains the additional documents 503b and 503c. A system stores documents from the same supplier together. Since the documents 503a-503c are stored together, the electronic content extraction platform 502 determines that they are from the same supplier, although the supplier identity is not known.

The electronic content extraction platform 502 generates data files storing the header regions of the documents 503b and 503c. For example, referring to FIG. 5C, the system stores the region 520b of the document 503b. The system compares the storage sizes of the data files for the headers of the documents 503a-503c to determine a difference between a smallest file size and a largest file size. The difference between a smallest file size and a largest file size is the file size bounds for the document 503a, as well as for the documents 503b and 503c.

The electronic content extraction platform 502 provides the additional features of the document 503a to a supplier prediction model 509. The supplier prediction model 509 is a machine learning model trained to predict a supplier's identity 510 based on the additional features, including the file size bounds value, the identified color channel, the file size of the header 520a, slice characteristics of slices in the document 503a, and an order of text content in the header 520a.

The electronic content extraction platform 502 provides the supplier identity prediction 510 and additional document data from the image-type document 503a to a document content extraction model 511. The document content extraction model 511 is a trained machine learning model that analyzes content in the document 503a and maps values—such as words and numbers—to defined attributes. For example, invoice 503a includes a field 529 containing the text "description." The document content extraction model 511 performs a mapping to (a) identify an attribute associated with the field "description," and (b) identify values for the attribute. In this example, the attribute is "services" and the values include "Initial Consultation," "Legal Research," and "Deposition Prep." Another field "Amount" 530 is unintelligible by the OCR application. However, the document content extraction model 511 identifies a set of varying monetary values 531. The document content extraction model 511 determines from the context of the values 531 that the values 531 correspond to an attribute "cost." Another field "Rate" 532 is also unintelligible by the OCR application. The document extraction model 511 identifies a set of monetary values 533 that are the same. The document extraction model 511 determines, based on the context of the values 533 (e.g., the values in the same column are the same, and the values are horizontally aligned with a "date" value, a "services" value, and another set of values that vary), that the values 533 correspond to an attribute "Rate."

Since different suppliers utilize different document formats, the document content extraction model 511 includes the supplier identity as an input feature to predict pairings of values contained in the document 503a with a set of defined attributes.

8. Practical Applications, Advantages, and Improvements

Enterprises store vast quantities of image-type documents. To be useful, the data in static or image-type documents must be converted into text-type content that can be stored in a database and searched by users or applications. Due to the vast quantities of data involved, enterprises rely on machine learning models to extract text content from image-type documents. Invoices are one type of image-type document stored by enterprises. Each invoice is associated with a particular supplier, corresponding to the goods and/or services described in the invoice. Since different suppliers may utilize different terminology and formatting, the supplier's identity is a primary input feature that has a strong correlation to the accuracy of a machine learning model in extracting content from the invoice. When machine learning models cannot determine a supplier's identity with text recognition, the accuracy of the machine learning model suffers. Embodiments described herein predict a supplier's identity for image-type documents, such as invoices, where a text recognition application may be unable to determine the supplier's identity. One or more embodiments extract non-textual features from the image-type document to predict the supplier. In addition, the system may also extract textual features, such as an order of text in a document, to include in a set of input features to a model for predicting a supplier. One non-textual feature is a file-size bounds feature, approximating noise in a set of image-type documents. Applying a machine learning model to a set of input features including the file-size bounds feature results in a prediction of the supplier's identity. The supplier's identity is the used in connection with a second machine learning model to extract text content from the image-type document. The prediction of the supplier's identity greatly increases the accuracy of the second machine learning model in extracting the additional content, such as key-value pairs, from the image-type document.

9. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a: particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

10. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

11. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
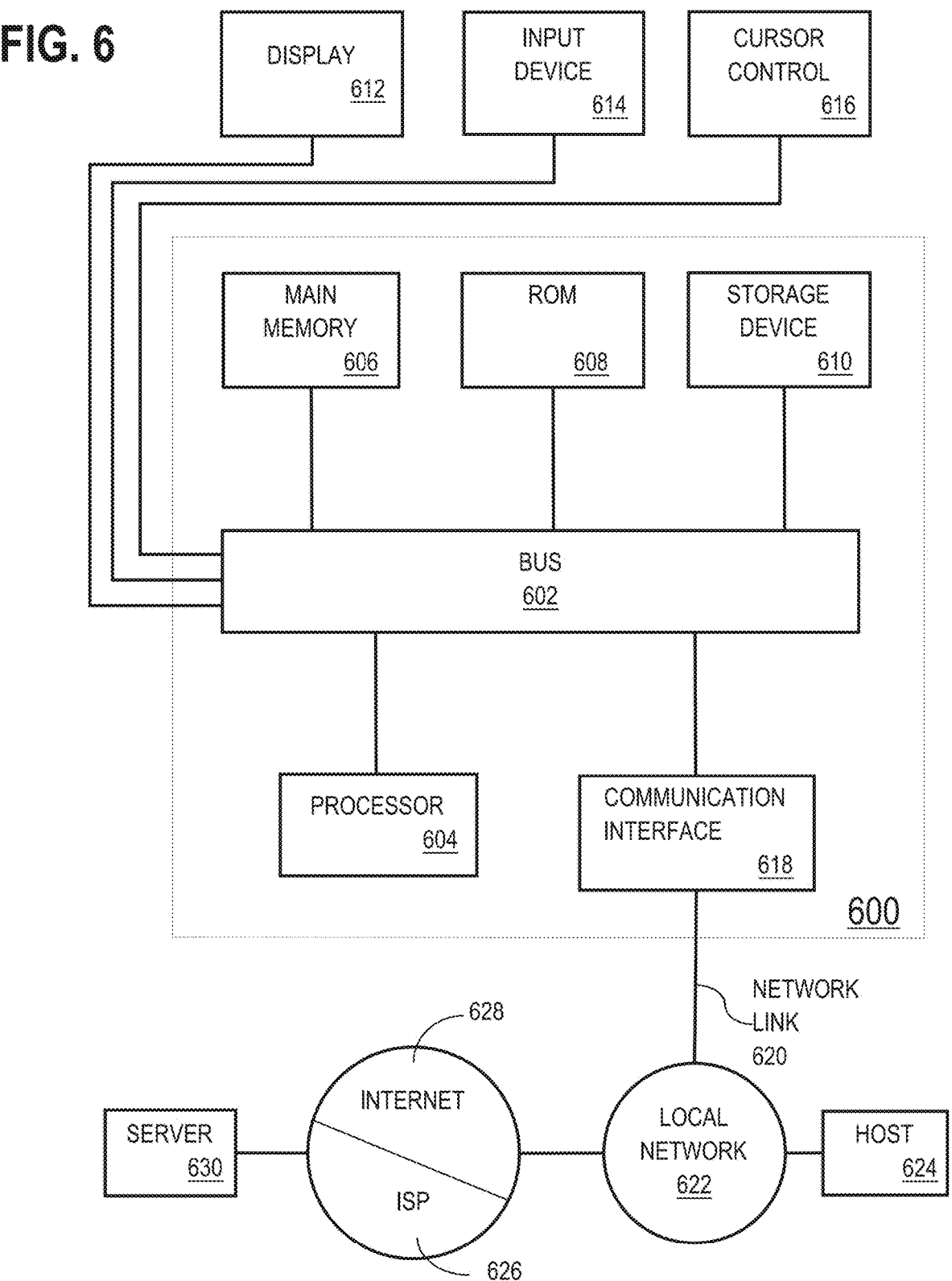
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:

training a first machine learning model to predict suppliers associated with image-type documents at least by:
obtaining a plurality of training data sets, a training data set of the plurality of training data sets comprising:
a feature vector representing an image-type document specifying at least one of goods and services and being associated with a supplier; and
a label identifying the supplier associated with the image-type document;
training the first machine learning model based on the plurality of training data sets to generate a first trained machine learning model;
receiving, by a content extraction platform, a target image-type document;
extracting a set of feature values from the target image-type document;
based on the set of feature values extracted from the target image-type document: generating a target feature vector representing the target image-type document;
applying the first trained machine learning model to the target feature vector to predict a particular supplier associated with the target image-type document;
based on the first trained machine learning model predicting the particular supplier:
identifying attributes, from a plurality of attributes, that correspond to the particular supplier; and
extracting, by the content extraction platform from the target image-type document, a first set of attribute values associated with the attributes that correspond to the particular supplier; and
storing, by the content extraction platform, the first set of attribute values in association with the attributes.

2. The non-transitory computer readable medium of claim 1, wherein the set of features extracted from the target image-type document includes non-textual features.

3. The non-transitory computer readable medium of claim 1, wherein the operations further comprise:
analyzing the target image-type document to detect text content specifying any suppliers associated with the target image-type document; and
determining that no suppliers associated with the target image-type document are detected;
wherein applying the first trained machine learning model to the target feature vector is performed in response to determining that no suppliers associated with the target image-type document are detected.

4. The non-transitory computer readable medium of claim 1, wherein the operations further comprise:
responsive to predicting, by the first trained machine learning model, the particular supplier associated with the target image-type document: selecting a second trained machine learning model, from among a plurality of candidate trained machine learning models, to predict a mapping of one or more attribute values contained in text content in the image-type document with corresponding attributes.

5. The non-transitory computer readable medium of claim 1, wherein the operations further comprise:
applying a second trained machine learning model to a second target feature vector to predict a mapping of one or more attribute values contained in text content in the image-type document with corresponding attributes, wherein the second target feature vector represents the target image-type document and includes the predicted particular supplier.

6. The non-transitory computer readable medium of claim 1, wherein the set of feature values includes a file size bounds feature value, corresponding to a difference between a data storage size of at least two image-type documents from the particular supplier, the at least two image-type documents including the target image-type document.

7. The non-transitory computer readable medium of claim 6, wherein the set of feature values further includes at least one of:
  a ratio of heights of horizontal slices, wherein the horizontal slices correspond to rows of pixels in the target image-type document which include content;
  a ratio of widths of adjacent vertical slices, wherein the adjacent vertical slices correspond to columns of pixels in the target image-type document which include content;
  a number of horizontal slices in the target image-type document;
  a diagonal length of at least one region of interest;
  a compression file size of the at least one region of interest;
  a color channel of the at least one region of interest;
  an order of text content in the target image-type document; and
  a content of text in a logo in the target image-type document.

8. The non-transitory computer readable medium of claim 6, wherein difference between a data storage size of at least two image-type documents from the particular supplier comprises:
  identifying a first instance of a region-of-interest in the target image-type document and a second instance of the region-of-interest in a second image-type document;
  storing the first instance of the region-of-interest as a first digital file;
  storing the second instance of the region-of-interest as a second digital file; and
  calculating a difference between a first file size of the first digital file and a second file size of the second digital file.

9. The non-transitory computer readable medium of claim 1, wherein the operations further comprise:
  based on the first trained machine learning model predicting the particular supplier:
    identifying an extraction methodology corresponding to the particular supplier,
  wherein the first set of attribute values is extracted based on the extraction methodology corresponding to the particular supplier.

10. The non-transitory computer readable medium of claim 9, wherein the extraction methodology identifies locations within the target image-type document that store the first set of attribute values.

11. A method comprising:
  training a first machine learning model to predict suppliers associated with image-type documents at least by:
    obtaining a plurality of training data sets, a training data set of the plurality of training data sets comprising:
      a feature vector representing an image-type document specifying at least one of goods and services and being associated with a supplier; and
      a label identifying the supplier associated with the image-type document;
    training the first machine learning model based on the plurality of training data sets to generate a first trained machine learning model;
  receiving, by a content extraction platform, a target image-type document;
  extracting a set of feature values from the target image-type document;
  based on the set of feature values extracted from the target image-type document: generating a target feature vector representing the target image-type document;
  applying the first trained machine learning model to the target feature vector to predict a particular supplier associated with the target image-type document;
  based on the first trained machine learning model predicting the particular supplier:
    identifying attributes, from a plurality of attributes, that correspond to the particular supplier; and
    extracting, by the content extraction platform from the target image-type document, a first set of attribute values associated with the attributes that correspond to the particular supplier; and
    storing, by the content extraction platform, the first set of attribute values in association with the attributes.

12. The method of claim 11, wherein the set of features extracted from the target image-type document includes non-textual features.

13. The method of claim 11, further comprising:
  analyzing the target image-type document to detect text content specifying any suppliers associated with the target image-type document; and
  determining that no suppliers associated with the target image-type document are detected;
  wherein applying the first trained machine learning model to the target feature vector is performed in response to determining that no suppliers associated with the target image-type document are detected.

14. The method of claim 11, further comprising:
  responsive to predicting, by the first trained machine learning model, the particular supplier associated with the target image-type document: selecting a second trained machine learning model, from among a plurality of candidate trained machine learning models, to predict a mapping of one or more attribute values contained in text content in the image-type document with corresponding attributes.

15. The method of claim 11, further comprising:
  applying a second trained machine learning model to a second target feature vector to predict a mapping of one or more attribute values contained in text content in the image-type document with corresponding attributes, wherein the second target feature vector represents the target image-type document and includes the predicted particular supplier.

16. The method of claim 11, wherein the set of feature values includes a file size bounds feature value, corresponding to a difference between a data storage size of at least two image-type documents from the particular supplier, the at least two image-type documents including the target image-type document.

17. The method of claim 16, wherein the set of feature values further includes at least one of:
  a ratio of heights of horizontal slices, wherein the horizontal slices correspond to rows of pixels in the target image-type document which include content;
  a ratio of widths of adjacent vertical slices, wherein the adjacent vertical slices correspond to columns of pixels in the target image-type document which include content;
  a number of horizontal slices in the target image-type document;
  a diagonal length of at least one region of interest;

a compression file size of the at least one region of interest;

a color channel of the at least one region of interest;

an order of text content in the target image-type document; and a content of text in a logo in the target image-type document.

18. The method of claim 16, wherein difference between a data storage size of at least two image-type documents from the particular supplier comprises:

identifying a first instance of a region-of-interest in the target image-type document and a second instance of the region-of-interest in a second image-type document;

storing the first instance of the region-of-interest as a first digital file;

storing the second instance of the region-of-interest as a second digital file; and calculating a difference between a first file size of the first digital file and a second file size of the second digital file.

19. A system comprising:

one or more processors; and memory storing instructions that, when executed by the one or more processors, cause the system to perform operations comprising:

training a first machine learning model to predict suppliers associated with image-type documents at least by:

obtaining a plurality of training data sets, a training data set of the plurality of training data sets comprising:

a feature vector representing an image-type document specifying at least one of goods and services and being associated with a supplier; and a label identifying the supplier associated with the image-type document;

training the first machine learning model based on the plurality of training data sets to generate a first trained machine learning model;

receiving, by a content extraction platform, a target image-type document;

extracting a set of feature values from the target image-type document;

based on the set of feature values extracted from the target image-type document: generating a target feature vector representing the target image-type document;

applying the first trained machine learning model to the target feature vector to predict a particular supplier associated with the target image-type document;

based on the first trained machine learning model predicting the particular supplier:

identifying attributes, from a plurality of attributes, that correspond to the particular supplier; and extracting, by the content extraction platform from the target image-type document, a first set of attribute values associated with the attributes that correspond to the particular supplier; and storing, by the content extraction platform, the first set of attribute values in association with the attributes.

20. The system of claim 19, wherein the set of features extracted from the target image-type document includes non-textual features.

21. The system of claim 19, wherein the operations further comprise:

analyzing the target image-type document to detect text content specifying any suppliers associated with the target image-type document; and determining that no suppliers associated with the target image-type document are detected;

wherein applying the first trained machine learning model to the target feature vector is performed in response to determining that no suppliers associated with the target image-type document are detected.

22. The system of claim 19, wherein the operations further comprise:

responsive to predicting, by the first trained machine learning model, the particular supplier associated with the target image-type document: selecting a second trained machine learning model, from among a plurality of candidate trained machine learning models, to predict a mapping of one or more attribute values contained in text content in the image-type document with corresponding attributes.

* * * * *